Patented June 16, 1942

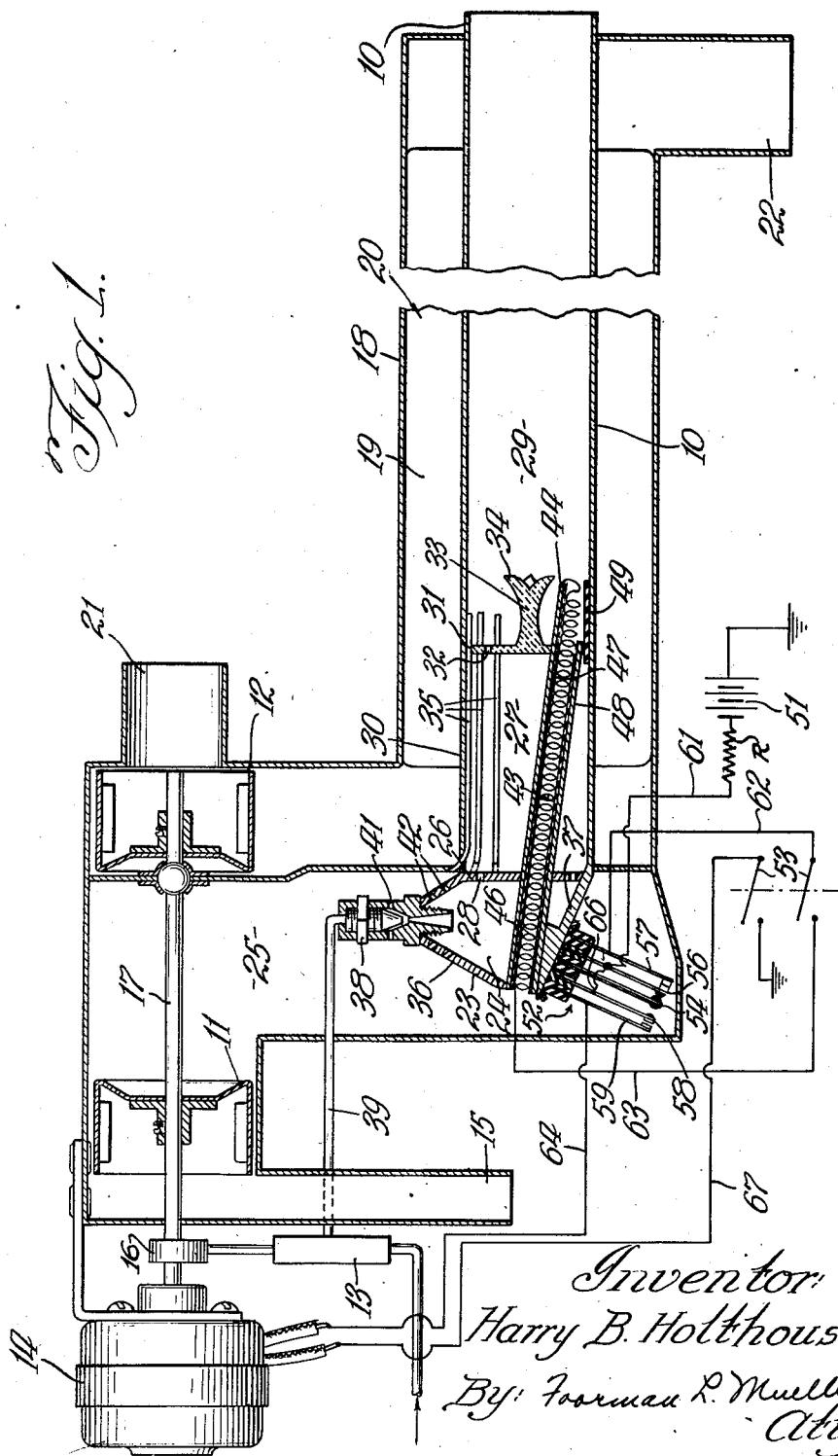

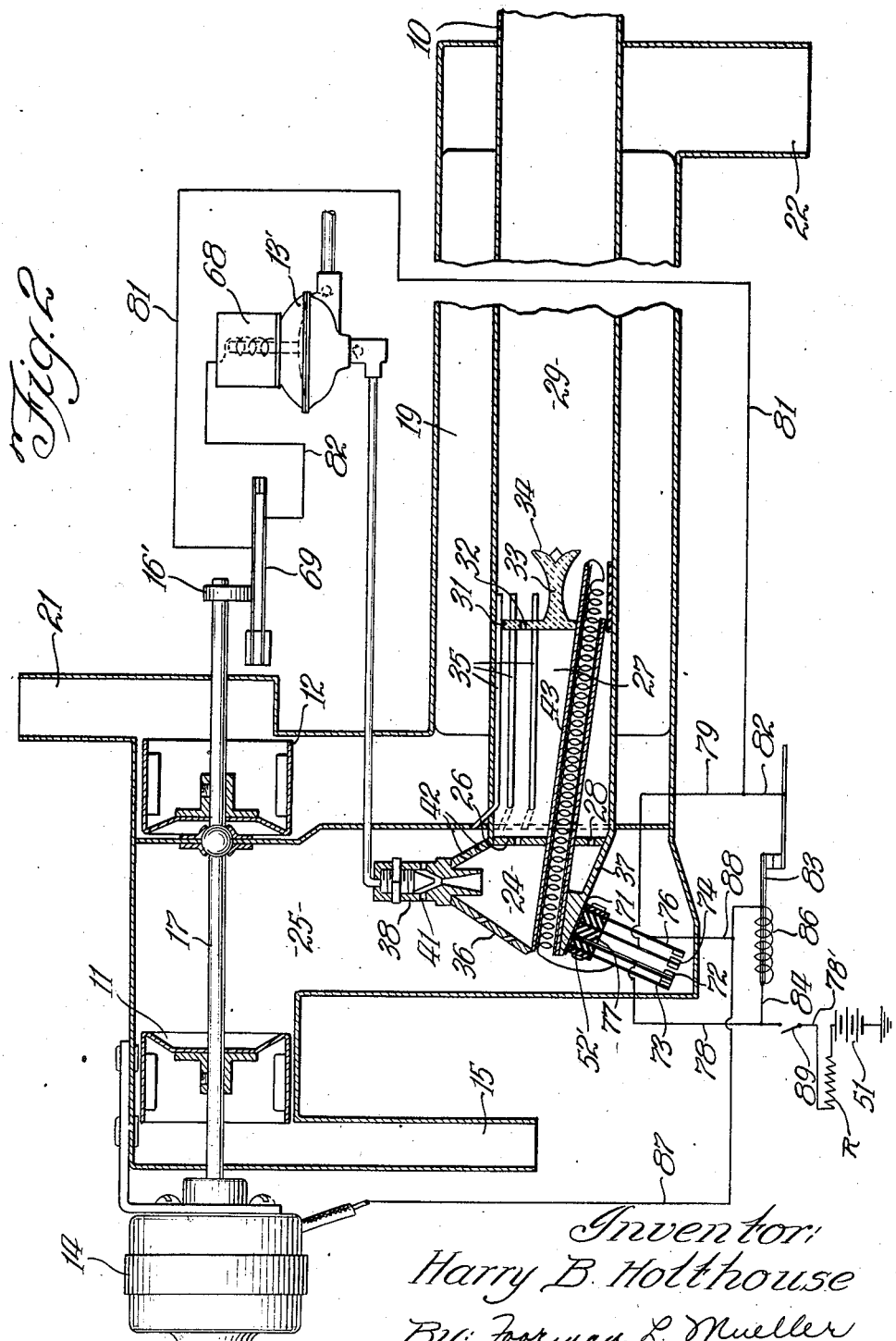

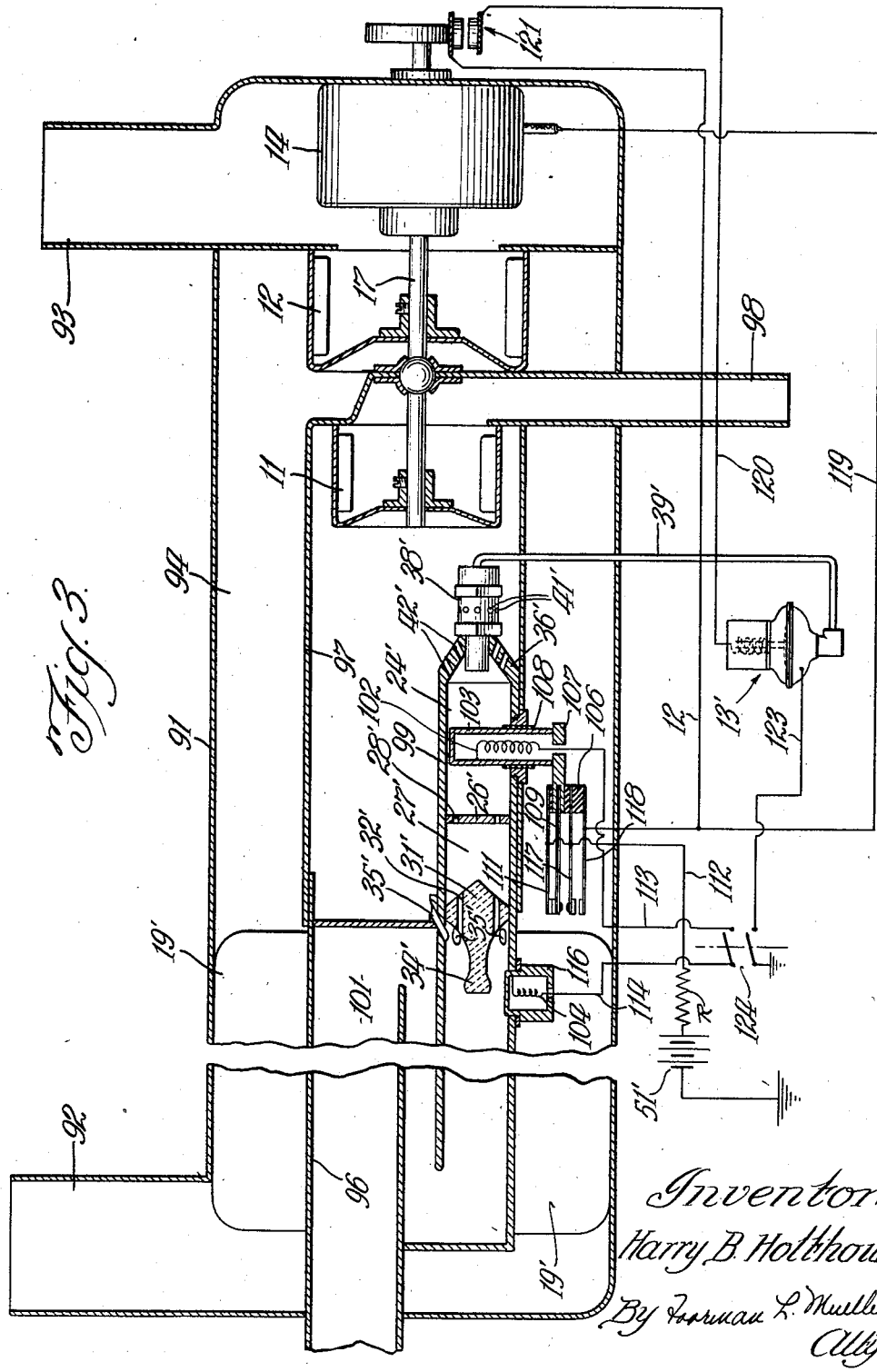

2,286,856

UNITED STATES PATENT OFFICE 2,286,856

CONTROL APPARATUS

Harry B. Holthouse, Chicago, Ill., assignor to Galvin Manufacturing Corporation, Chicago, Ill., a corporation of Illinois Application March 30, 1940, Serial No. 327,065

14 Claims. (Cl. 158—28)

This invention relates generally to control systems for heating devices and in particular to an electrical control system for an automobile heater, which is operable independently of the automobile engine. This application is a continuation in part of application Serial No. 307,340 filed December 2, 1939.

The usual automobile heater, which generates heat independently of the car engine, is dependent for its operation on the use of a high operating air pressure to provide for a proper atomization of the fuel for combustion purposes. The power for producing this high pressure is obtained by utilizing a portion of the power of the automobile engine, either by direct connected means or in the case of a suction-type heater, by connection of the heater with the engine intake manifold. The heater, therefore, is dependent for its operation upon a concurrent operation of the car engine and is directly responsive to engine running conditions. The combustion which occurs in the usual heater is thus of non-uniform and varying characteristics and the heat generated is in response to engine conditions rather than to car heating conditions. Also in manifold-connected heaters the combustion interferes directly with an efficient operation of the car engine by admitting into the engine intake manifold varying portions of burned and unburned mixtures apart from the usual automobile carburetor mixture. The engine, therefore, is more efficiently operated in the summer than in the winter when it receives its hardest service. The use of the engine power, however, supplies air at high pressure and in large quantities, so that sufficient heat for car heating purposes can usually be provided even though such heat constitutes only a portion of the heat which can be obtained by the use of such a large quantity of air. The control system for a heater operable at high pressures is thus of relatively simple design since it operates generally to effect and maintain combustion only by controlling the air supply rather than by conditioning the fuel mixture for an efficient and proper combustion.

Attempts have been made to overcome the disadvantages which accompany the operation of automobile heaters dependent upon operation of the automobile engine, but these attempts have been thwarted at the outset by the fact that the only power available, apart from the engine power, for operating any of the car equipment is the car battery, which is of limited capacity. With the battery, generator and other associated electrical equipment as provided in the usual automobile ignition circuit, the maximum available current for heater operation is probably about 7 amperes. It is possible, of course, that a current heavier than 7 amperes might be obtained over some periods of operation, but this heavier current would result in a serious drain on the battery, and in the winter time, would seriously interfere with the satisfactory operation and starting of the automobile engine. The operation of an automobile heater entirely from the battery, therefore, requires a complete change in the size and assembly of the parts of the usual car heater to adapt such parts for operation by the battery. The decrease in the size of these parts effects a corresponding decrease in their output capacity so that the operating pressures which can be obtained within the practical current limitations of the battery are too low to effect a mixing of the fuel by means of atomization, as is possible where high pressures are available. The usual heater control system is thus rendered inapplicable for use with low operating pressures so that car heaters operating at low pressures have never become commercially practical.

It is an object of this invention therefore, to provide an improved control system for an automobile heater of low pressure type and operable independently of the car engine.

A further object is the provision of a control system for a low pressure heating device which is of simple, rugged construction and operable to provide for an efficient and continuous burning of the fuel and air supplied to such heating device.

Still another object is the provision of a control system for a low pressure heating device, which is operable to condition the air and fuel supplied to the heating device for a most advantageous mixing and for burning in the combustion chamber in a vaporous form.

A feature of this invention is the provision of a control system for a low pressure heater, in which a thermal unit is so located as to be immediately responsive to temperature changes of the combustible mixture, and operable to maintain such mixture at a pre-determined temperature independently of combustion conditions.

Another object of this invention is the provision of a control system for a heater employing low pressures, which operates to provide for an efficient burning of the fuel and air mixture during normal heater operation by continuously preparing the fuel and air for intimate mixing.

It is another object of this invention to provide a control system for a low pressure heater, in which the speed of the air supply motor is directly responsive to the operating conditions of the air and fuel pre-heating means, so as to effect an automatic choking or enriching of the air and fuel mixture when the pre-heating means is in operation.

A further feature of this invention is to provide a control system for a low pressure heater in which the means for circulating air about the heater is controlled simultaneously with the air supply means in response to the operating condition of the air and fuel mixture pre-heating means. A reduction in the heat being carried away from the heater is thus produced substantially simultaneously with the generation of heat by the preheating means so that the temperature conditions for processing the mixture are maintained substantially constant.

Another object is to provide a control system for a low pressure automobile heater in which an air and fuel pre-heating means is operatively and thermally associated with a thermal unit and positioned in the path of the air and fuel entering the heater so as to be constantly cooled thereby, the thermal unit being actuated in response to the temperature conditions of the pre-heating means to operate the pre-heating means.

Other objects, features and advantages of this invention will be apparent from the following description when taken in connection with the accompanying drawings in which:

Fig. 1 illustrates diagrammatically one embodiment of the invention;

Fig. 2 is a diagrammatic illustration of a modified form of the invention, and

Fig. 3 is a diagrammatic illustration of a further modification of the invention.

In practice this invention is contemplated for use with an automobile heater which is operable independently of the car engine and operated entirely by power from the car battery. Since the heaviest drain on the car battery is in the winter time, and since the heater is used only during that time, it is contemplated further that the air and fuel supply motor be of a size to operate on about 3 amperes of current so as to be far below the normal amperage rating of a car battery and well within all practical factors of safety for heater current consumption. A 3 ampere motor provides for air pressures on the order of ⅛ to ¼ of an inch of water. Heaters in the prior art have been operated on pressures as low as ¼ of a pound per square inch, but it is readily apparent that this pressure is about 30 to 60 times greater than the pressures employed in applicant's heater. A pressure of ¼ pound per square inch is thus relatively high and would require a motor which would be too large for commercial and practical application in a battery-operated car heater.

Fuel cannot be properly atomized by air pressures around ⅛ inch to ¼ inch of water, so that the air and fuel mixture entering the heater forms what is commonly referred to as a "wet mixture." Before this "wet mixture" can be efficiently burned it must be completely broken up and intimately mixed prior to ignition. The control system of this invention, therefore, provides for a vaporizing of the fuel mixture prior to ignition and the maintenance of the vaporizing conditions independently of combustion conditions and the temperature conditions of the fuel and air supplied to the heater. After vaporization the fuel mixture is ignited in the usual manner by a suitable heating coil, the circuit of which forms a part of the control system.

With reference to the drawings similar characters of reference shall designate similar parts throughout the several views. In Fig. 1 the automobile heater includes a tubular casing 10, an air supply fan 11, an air circulating fan 12, a fuel pump 13 and a motor 14. The motor 14 is common to the fans 11 and 12 and to the fuel pump 13, which is illustrated as of reciprocating type and operated by a cam 16 on the motor shaft 17. The casing 10 is provided with a tubular housing 18 which is concentrically spaced thereabout by radiating fins 19, to form an air circulating passage 20 about the casing 10. The re-circulated air is drawn into the heater through inlet 21 and after passing about the fins 19 in the passage 20 is discharged from the heater through the outlet 22. The inlet 21 may be arranged to draw air into the heater from either the inside or outside of the car passenger compartment and the outlet 22 may be suitably connected to pass the heated air into the passenger compartment. The air for combustion is drawn into the heater through inlet 15 by fan 11 and is discharged into passage or supply chamber 25 for admission into an air and fuel mixing chamber 24 in a manner to be later described.

The mixing chamber 24 includes an inclosure 23 which is located within the passage 25 at the inner end of the casing 10; the chamber being in registering alignment with the casing 10. Adjacent the mixing chamber 24 and within the casing 16 is an equalizing chamber 27, which is separated at one end from the chamber 24 by a circular partition or baffle plate 26, which is provided in a heat conducting metal such as copper and is secured to the inner wall of the casing 10 as by brazing or like means. Communication between the chambers 24 and 27 is through apertures 28, which are formed within the partition member 26 near its peripheral edge. The opposite end of the equalizing chamber 27 is separated from a combustion chamber 29 by a circular partition 31 which is provided in a suitable heat insulating refractory material. The partition 31, near the peripheral edge thereof, is formed with apertures 32 to provide space communication between the chamber 27 and the combustion chamber 29. The central portion of the partition 31 is imperforate and is formed with an extension 33 which extends longitudinally of the casing 10 into the combustion chamber 29. The outer or free end of the extension 33 is formed with radially extending prongs or fingers 34 which attain a red glow during the operation of the heater to function as igniter elements.

The inclosure 23 for the mixing chamber 24 is formed with a cone portion 36 and an inclined wall portion 37 which is oppositely disposed from the cone portion 36. Fuel is admitted into the mixing chamber 24 through an injection nozzle 38, which is suitably secured in the apex of the cone portion 36 and is connected to the fuel pump 13 through a supply line 39. The nozzle 38 is formed with apertures 41 for admitting a portion of the supply air from the passage 25 into the fuel stream prior to its admission into the mixing chamber 24. Another portion of air from the supply chamber 25 is admitted into the mixing chamber through air ports 42, which are formed in the cone portion 36 in a manner to progressively direct the air into the fuel stream after its ejection from the nozzle 38. The opposed disposition of the nozzle 38 and wall 37 causes the air and fuel mixture to impinge upon the preheating portion of a combination preheating and igniting element 43, which is supported in part on the inclined wall 37 and is slantingly arranged longitudinally of the mixing chamber 24 and equalizing chamber 27 through the partitions 26 and 31, the preheating portion being disposed in the chamber 24 and the igniting end 44 extending into the combustion chamber 29 to a position between the igniter elements 34 and the ceramic partition wall 31. A further portion of air from the supply chamber 25 is admitted into the air and fuel mixture after ignition thereof, through tubes 35 which extend beyond the partition wall 31 into the combustion chamber 29 and will be later fully described.

The heat element 43 includes a resistance coil 46 which is inserted in an insulating tube 47, which in turn is mounted in a copper tubular sleeve 48. The element 43 is in heat conducting relation with the wall 37 and with the copper partition plate 26, through which it passes. The end 44 of the heat element is formed to partially expose a portion of the resistance wire 46, the exposed portion being faced downwardly in the combustion chamber but separated therefrom by a suitable insulating means such as a mica shield 49. The positioning of the exposed end of the resistance wire 46 adjacent the bottom of the combustion chamber 29 serves to effect a more ready ignition of the mixture passing into the chamber 29, since any condensation of the fuel from the mixture will occur near the wall portions of the chamber with the condensate tending to drop or accumulate at the bottom of the casing 10. The heat projected from the end 44 of the element 43 accomplishes ignition rather than the heat surrounding the housing element 47. The projected heat is confined at the end 44 by the mica shield 49 and ceramic partition 31, the degree of ignition heat being determined essentially by the length of the heating element 43 and being contemplated in the invention to be about 1800° F.

The conditioning of the air and fuel to provide for its efficient and complete burning is obtained by a novel control system which will now be fully described.

The control system includes a battery 51, a thermal switch unit 52 and a main double-throw switch 53. The thermal unit 52 includes a bi-metal arm 54 disposed intermediate paired contact arms 56, 57 and 58, 59 and is mounted on the wall portion 37 of the mixing chamber 24 and on the outside thereof, in a position to be directly responsive to the heat of the heating element 43. The bi-metal arm 54 is grounded to the wall 37 and serves only to actuate and not to be electrically connected with the contact arms 56 and 57, and 58 and 59 which are suitably mounted in a manner to be insulated from each other and from the supporting wall 37. The contact arms 56 and 57 are normally closed and are in series connection with each other and with the heating element 43, the circuit for the heating element being completed by conductors 61 and 62, switch 53 and conductor 63, the resistance wire 46 being suitably grounded at its end 44 to the copper sleeve 48. The contact arms 58 and 59 are normally open, the arm 59 being connected to the motor 14 through conductor 64, and the arm 58 being connected to the battery 51 through conductors 66 and 61; the motor circuit being completed by the ground connection 67. Because of the low air and fuel operating pressures it is essential that the processing of the fuel be substantially continuous during operation of the heater and that the control changes for maintaining the processing conditions be effected in a minimum of time. The bi-metal switch 54, therefore, is mounted adjacent the heater element 43 on the wall 37 and in the path of the fuel and air from the nozzle 38 and ports 42, the mixture acting to effect a continuous cooling action on the element 43 and wall 37 by impingement thereon. The bi-metal switch 54 is thus immediately responsive to a reduction in the temperature of the mixing chamber 24 below that required for a thorough and intimate mixing of the air and fuel, as will be later fully explained. To further speed the response of the bi-metal arm 54 to maintain a proper temperature control of the chamber 24 the thermal unit 52 is positioned within the air passage 25, so that the bi-metal arm 54 is also cooled directly by the incoming supply air.

As previously noted the rating of the motor 14 is of the order of about 3 amperes, and since the fuel pump 13 and air fan 11 are correspondingly small the pressure of the fuel and air entering the mixing chamber 24 is too low to effect a proper atomization of the air and fuel mixture for efficient combustion. The air and fuel, therefore, are preheated in the mixing chamber 24 to an optimum temperature which provides for a most advantageous mixing thereof, those portions of the heating element 43 positioned within the mixing and equalizing chambers 24 and 27, respectively, acting to heat the mixing and equalizing chambers and their surrounding walls to a temperature which will effect a complete vaporization of the fuel and hence a complete mixing thereof with the air, the equalizing chamber 27 acting also to distribute all portions of the mixture substantially uniformly over the cross-sectional area of the casing 10 prior to ignition thereof in the chamber 29. The preheating unit does not operate as a "hot spot" as such is considered with reference to a heater element or portion but operates to heat the mixing and equalizing chambers and their surrounding walls at the entrance to the combustion chamber 29 to an optimum temperature for mixing the air and fuel, the variation in the temperature within the chambers and their surrounding walls being about 10 degrees. The temperature in the mixing and equalizing chambers, however, is at all times less than that which would effect an ignition or burning of the fuel within such chambers.

In the operation of the control system energization of the heating element 43 is obtained by closing the main switch 53, current from the battery 51 flowing through conductor 61 to normally closed contact arms 56 and 57 and through conductor 62, switch 53 and conductor 63 to the resistance wire 46. The heat from the heater element 43 is effectively distributed throughout the chambers 24 and 27 by direct radiation into the chambers and by conduction through the copper partition 26, walls 30 and 37 and cone portion 36, the latter elements also being provided in a high heat conducting material such as copper. As the mixing chamber 24 and its surrounding wall portions approach a temperature of around 150° F. the bi-metal arm 54 is moved upwardly to the left as viewed in Fig. 1 in response to this temperature rise, to mechanically engage contact arm 58 and move such arm into electrical connection with contact arm 59 to effect an operation of the motor 14 and hence an operation of the fans 11 and 12 and fuel pump 13, the normally closed contact arms 56 and 57 being under tension to move with the bi-metal arm 54. The heating element 43 thus continues to be energized with the starting of the motor 14.

When the mixing chamber reaches a temperature of about 200° F., which represents a minimum operating temperature for effecting an advantageous mixing of the low pressure air and fuel for efficient combustion, the bi-metal arm 54 and arm 56 move away from the contact arm 57 to effect an opening of the heater element circuit. At this temperature the fuel impinged against the hot heating element 43 and also against the hot wall 37, is substantially immediately vaporized thereby, the inclination of the wall 37 serving to deflect the fuel against the hot partition wall 26 so that practically all of the fuel is vaporized and mixed with the air prior to the passage of the mixture through the apertures 28 into the equalizing chamber 27. The chamber 27 acts to maintain the fuel in a vaporized condition to reduce the occurrence of any condensation of the fuel particles from the mixture; the chamber 27 acting also to distribute the vaporized mixture substantially uniformly over the sectional area of the casing 10, to reduce to a minimum the occurrence of any rich or lean portions in the mixture. The conditioned mixture is forced from the chamber 27 through the apertures 34 in the ceramic partition 31 into the combustion chamber 29 where it is ignited by the igniter elements 34, the igniter elements 34 having been previously heated to a red glow by the combustion of the mixture as initiated by the element 44. By virtue of the loose terminology applicable thereto, the elements 34 may be referred to as igniters. In operation, however, it seems that the igniters or heating elements 34 gasify the originally vaporous fuel mixture which passes adjacent thereto and that this gasification increases the rate of burning of the mixture and expands the mixture to accelerate its flow through the chamber 29. The igniter elements 34 thus function effectively in igniting the fuel entering the combustion chamber 29 after the heater element circuit has been opened.

With the occurrence of combustion in the chamber 29 a certain amount of heat from the combustion chamber is transmitted through the housing 10 and also through the heater element 43 back to the mixing chamber 24, so as to decrease the dissipation of heat from the mixing chamber 24 by the cooling action of the air and the vaporization of the fuel in the chamber. The heat transmitted through the casing 10 from the combustion chamber 29 lessens or compensates to some extent the cooling effects on the heat element 43 and wall 37 by the impingement thereon, and the resultant vaporization, of the fuel and air and in this manner acts as a saving device to reduce the frequency of operation of the heating element 43. The location of the thermal unit 52, as previously described, in close proximity to the heater element 43 provides for an immediate control of the heater element by the thermal unit since there is substantially no time lag between the conflicting effects on the heater element of the heat from the combustion chamber and the cooling action from the vaporization of the air and fuel, and the operation of the heater element by the thermal unit in response to such heating and cooling effects. The operation of the heater, however, is not dependent upon the transmission of heat from the combustion chamber to the mixing chamber 24 and it is readily apparent that a satisfactory operation can be obtained by a substantially constant operation of the heater element 43.

The efficient combustion of the fuel mixture in the chamber 29 continues until the temperature in the mixing chamber 24 falls below about 200° F., at which time the bi-metal arm 54 moves contact arm 56 downward to contact arm 57 to again energize the heating element 43; the contact arms 58 and 59 remaining closed to continue the supply of air and fuel to the mixing chamber 24. Contact arms 56 and 57, and 58 and 59, respectively, are biased with respect to the bi-metal arm 54 to provide for a concurrent closed position of the paired contacts for a movement of the arm 54 corresponding to a change of about 50° F. in the temperature of the mixing chamber 24. This concurrent closed position of the contact arms 56 and 57, and 58 and 59, may occur between mixing chamber temperatures of approximately 150° F. to 200° F. The motor 14, therefore, continues to operate while the bi-metal switch 54 makes and breaks the contact between arms 56 and 57, during normal operation of the heater. When the temperature of the chamber 24 again reaches about 200° F., the switch 54 breaks away from the contact arm 56 to again open the circuit of the heater element 43. This cyclic action of the switch 54 continues during normal operation of the heater. The control system is rendered inoperative and operation of the heater stopped by opening switch 53.

The energization of the heat element 43 by the switch 54 during normal operation of the heater does not, however, indicate a failure of combustion in the chamber 29 since the processing temperature in the mixing chamber 24 is independent of the heat in the combustion chamber. Energization of the heating element 43 may be the result of a sudden change in temperature of the air and fuel entering the mixing chamber 24. The mixture in the chamber 24, therefore, is processed independently of the burning conditions present in the combustion chamber 29 and the switch 54 operates to energize the heating element 43 only in response to the temperature conditions of the mixing chamber 24.

In the event the switch 54 is actuated to a position which normally effects an energization of the heat element 43, but for some reason the heat element fails to operate, the switch 54 will continue to move downwardly to the right until engagement between contact arms 58 and 59 is broken thereby opening the motor circuit and stopping the supply of fuel and air to the mixing chamber 24. The system, therefore, operates to shut the heater off upon a failure of ignition to eliminate the accumulation of any raw mixture in the combustion chamber and possible explosion of the mixture on a later starting of the heater. Also at the start of heater operation, the heater element 43 must be operative to move the switch 54 before the motor circuit will close to supply air and fuel to the heater. It is impossible, therefore, for the heater to operate unless the heater element 43 is conditioned for operation, since closing of the motor circuit is dependent upon sufficient heat being in the chamber 24 to effect a movement of the switch 54 to make contact between arms 58 and 59.

The function of the heater element 43 in maintaining the chamber 24 at a substantially constant pre-determined temperature, and the operative control of the heater element 43 by the thermal unit 52 is facilitated by the co-action of the heater element and motor circuits, as will now be explained. The conductor 61 connecting the battery 51 with contact arm 56 is common to both the heater element and motor circuits. Thus upon initial closing of the switch 53 the line drop in conductor 61 is the result only of the load of the heater element 43. Upon initiation of combustion the line drop in the conductor 61 is the additive effect of the heater element 43 and the motor 14. However, upon the mixing chamber 24 reaching its optimum temperature which causes the bi-metal arm to break contact between arms 56 and 57, the line drop in the conductor 61 is the result only of the load of the motor 14. Since the line drop effected by the heater element is proportionally high as compared to that of the motor 14, breaking of the heater element circuit causes a speeding up of the motor 14, to a speed which is about 30% higher than its speed with the heater element circuit closed. It is apparent, of course, that this speed variation is accomplished by having the resistance R in the conductor 61 of a pre-determined value and dependent upon the load of the heating element. Since speeding up the motor 14 also speeds up the fans 11 and 12, a greater amount of air is drawn in by the fan 12 for circulation about the radiating fins 19 and a greater amount of air is supplied to the chamber 25 by the fan 11 to provide for a leaning of the mixture in the chamber 24. Upon an increase in the line drop in conductor 61 by the concurrent energization of the heater element and motor circuits, the motor 14 will slow down so that the amount of air circulated about the fins 19 and the amount of air supplied to the chamber 24 is correspondingly decreased. A slowing down of the motor 14 is thus concurrent with the energization of the heater element 43 so that heating of the chamber 24 by the heater element 43 is aided by a decrease in the dissipation of heat from the heater by the fan 12. Since heat, therefore, is being drawn away from the parts surrounding the chamber 24 at a lesser rate during times of heater element energization, the heat generated by the heater element is more effectively and rapidly localized in the chamber 24. Also by virtue of the fan 11 and pump 13 being operated by a common motor 14, the reduction in the quantity of air discharged by the fan at a slow motor speed is proportionately greater than the reduction in the quantity of fuel discharged by the pump 13 at such slow speed, so that a richer mixture and hence an automatic choking effect is provided concurrently with an energization of the heater element 43. There is thus obtained a positive and ready combustion of the fuel for starting and cycling purposes and a consequent rapid building up of the heater to optimum operating conditions. The temperature of the chamber 24 is thus confined between substantially close operating limits to reduce temperature drifting therein during normal heater operation.

Since the quantity of air admitted into the heater device is relatively small, it is apparent that the mixture in the chamber 24 will be relatively rich, so that ignition thereof is readily effected by the hot end 44 of the element 43. This rich mixture, however, although readily ignited is not adapted for a complete and efficient burning. To provide for the complete burning of the fuel a portion of the air from the air chamber 25 is admitted through tubes 35, previously mentioned, into the combustion chamber 29. The tubes 35 may be suitably arranged about or within the equalizing chamber 27 and extend within the combustion chamber through the ceramic partition 32. The air thus admitted into the combustion chamber 29 is not mixed with the mixture entering the combustion chamber 29 from the equalizing chamber 27, until after ignition of such mixture by the end 44 of the heater element 43, which operates in a region of rich mixture. The rich mixture from the chamber 27 is thus first ignited by the heater element 43 and after ignition is leaned by the addition of supplementary air from the tubes 35 to effect a complete burning of the mixture. The quantity of air admitted by the tubes 35 into the chamber 29 is controlled directly by the speed of the fan 11 in accordance with the richness ratio of the mixture in the chamber 24.

In the modified embodiment of the invention shown in Fig. 2, the fuel pump 13' is of diaphragm type and operated by a solenoid 68 in response to actuation of a breaker assembly 69 by a cam 16' which is mounted on the motor shaft 17. The remainder of the heater structure is similar to that of Fig. 1, previously described.

The control system includes a thermal unit 52' which is electrically insulated from the wall 37 but thermally related therewith by suitable means such as a mica strip 71. The unit 52' includes a conducting bi-metal contact arm 72 which is normally in closed contact with arm 73 and adapted to actuate in successive order contact arms 74 and 76, the arms 72, 73, 74 and 76 being insulated from each other by the supporting insulating base 77. The arm 73 is connected with the heater element 43, the heater element circuit being completed through the bi-metal arm 72 and conductors 78 and 78' to the battery 51; the heater element being grounded at its end 44 to the copper sleeve 48. The arm 74 is included in one of the operating circuits for the pump 13', the circuit from the battery 51 comprising the conductor 78, bi-metal arm 72 and arm 74, conductors 79 and 81, breaker assembly 69, conductor 82 and solenoid 68. The other circuit for the pump 13' does not include the thermal unit 52', the conductor 81 being connected with the battery 51 through conductor 82, normally closed bi-metal time element 83 and conductors 84 and 78. The motor 14 is also operable through two circuits, the first of which from the battery 51 consists of conductors 78, 78' and 84, heater coil 86, and conductor 87. The second motor circuit includes the thermal unit 52' and is comprised of conductors 78 and 78', bi-metal arm 72, contact arms 74 and 76, and conductors 88 and 87.

In the operation of the control system it is to be understood that the functions of the heater parts are similar to those which were fully described in connection with the embodiment of Fig. 1. The system is operated by closing of the main switch 89, which closes the heater element circuit, whereby to immediately energize the heater element 43. Closing of the switch 89 also closes the motor circuit including the bi-metal time element 83 so that air and fuel are admitted into the mixing chamber 24 simultaneously with the initiation of operation of the heater element 43. The normally closed bi-metal time element 83 is arranged in heat exchange relation with the heating coil 86 in the motor circuit, the current load of the motor passing through the coil serving to heat the coil for actuation of the bi-metal time element 83. The bi-metal time element 83 is thus acted upon by the heat from the coil 86 immediately upon closing of the switch 89. When the bi-metal time element becomes hot, the circuit therethrough is broken. This would normally open the pump circuit to render the pump 13' inoperative. However, the time required for the time element 83 to reach an open contact position, which is about four tenths of a minute, is sufficient to permit the temperature in the mixing chamber 24 to be raised by the heater element 43 to about 150° F. which effects a movement of the bi-metal arm 72 toward the right, as viewed in Fig. 2, to electrically contact the contact arm 74 to close the pump circuit including the thermal unit 52' and to short circuit the bi-metal time element 83. The pump 13' is thus continued in operation after the opening of the bi-metal element 83, and since the element 83 is maintained open by operation of the motor 14 which continues to pull its current supply through the heater coil 86, further operation of the pump 13' is controlled by actuation of the arm 74 by the bi-metal arm 72.

In the case where initial operation of the pump 13' is not continued by the closing of the pump circuit through the thermal unit 52', such as when the heater element fails for some reason to become energized, the bi-metal time element 83 in response to heat from the coil 86 will open to break the pump circuit including such element, and the cool bi-metal arm 72 will remain inactive to maintain open the pump circuit including the thermal unit 52'. The pump 13' is thus rendered inoperative, the motor 14 continuing in operation to force or sweep out from the heater the fuel supplied thereto during operation of the pump to prevent any possible explosion of the fuel on later starting of the heater. The continued operation of the pump 13', therefore, is dependent upon an energization of the heating element 43; the duration of pump operation without such energization of the heating element being defined by the time required for the opening of the bi-metal time element 83. It is apparent of course, that non-operation of the motor 14', upon closing of switch 89, will also render the pump 13' inoperative since the pump operation is controlled by the breaker assembly 69, which is actuated by the motor shaft 17. No air and fuel, therefore, will be admitted to the heater and movement of the bi-metal arm 72 in response to the heat from the heat element 43 will be without effect in starting heater operation. It is understood that a mechanical time element can be employed instead of the bi-metal time element 83.

However, if the heat element 43 does heat up upon closing of the switch 89, the bi-metal arm 72 will continue its movement toward the right after electrical contact with the arm 74 and as the temperature in chamber 24 increases to about 200° F. the bi-metal arm 72 will break contact with the contact arm 73 to de-energize the heater element 43, and will move contact arm 74 into contact with arm 76 to short-circuit the heater coil 86 to complete the motor circuit through the thermal unit 52', for a purpose to be hereinafter described. Ignition of the air and fuel supplied to the motor is continued by the igniter elements 34 which have been heated to a red glow by the occurrence and continuance of combustion in the chamber 29. The heater is thus conditioned to provide for the complete and thorough mixing of the low pressure air and fuel by vaporization, whereby to assure its efficient and positive combustion.

When the temperature in the mixing chamber 24 drops below a pre-determined degree, such as 200° F., the bi-metal switch 72 moves to the left; breaking the contact between arms 74 and 76 to provide for the energization of the coil 86 and to effect contact with arm 73 to energize the heater element 43 to raise the temperature of the chamber 24. Upon the chamber 24 reaching its optimum temperature the bi-metal arm 72 moves arm 74 into contact with arm 76 to short-circuit coil 86 and breaks contact with arm 73 to de-energize the heat element 43. This cycle of the bi-metal arm 72 is continued during the normal operation of the heater.

The bi-metal arm 72 and arm 73 are normally in closed contact, and contact therebetween is broken when the temperature of the mixing chamber 24 is raised to about 200° F. Contact between the bi-metal arm 72 and arm 74 is effected at about 150° F., and contact between arms 74 and 76 at about 200° F. The arms 73 and 74 are thus in concurrent closed contact with the bi-metal arm 72 over a temperature range of about 50° F. so that the air and fuel circuits remain closed and in continuous operation during the cyclic actuation of the arm 73 by the bi-metal arm 72. To stop the operation of the heater it is necessary to merely open the manually controlled switch 89.

As above described the actuation of the arm 74 by the bi-metal arm 72 to electrically contact and disconnect the arm 76 places the coil 86 in and out of the motor operating circuit for a purpose now to be fully explained. In the closing of the switch 89 the line drop in the conductor 78' as produced by the resistance R therein is the additive result of the effects of both the heater coil 86 and the heater element 43. The motor 14, the operating circuit of which includes the conductor 78', thus operates at its slowest speed at the start of heater operation. As the temperature of the chamber 24 approaches its optimum temperature the bi-metal arm 72 moves arm 74 into contact with arm 76 to cut the heater coil 86 from the motor operating circuit, whereby to increase the speed of the motor and thus provide a second motor speed. When the chamber 24 reaches its optimum temperature the bi-metal arm 72 breaks contact with arm 73 to open the circuit of the heater element whereby to further reduce the line drop in the motor operating circuit and to further increase the speed of the motor 14, thus providing the third and highest speed of the motor. Conversely the movement of the bi-metal arm 72, upon cooling of the chamber 24, energizes the heater element 43 and breaks the contact between the arms 74 and 76, to cut the heater coil 86 into the operating motor circuit. The line drop in the motor circuit is thus progressively increased so as to correspondingly decrease the motor speed and hence the speeds of the fans 11 and 12,and fuel pump 68. By virtue of the fans 11 and 12 and pump 68 being operated by the common motor 14, the reduction in the air output by the fans on a decrease in the speed of the motor, is proportionately greater than the reduction in the amount of fuel discharged by the pump 68. Thus when the motor 14 slows down the fuel to air ratio is increased so that the heater is supplied with a richer mixture at slow speeds than at high speeds. A decrease in the motor speed, therefore, provides for a more rapid control of the temperature conditions in the chamber 24 by automatically enriching the air and fuel mixture concurrently with an energization of the heater element 43 and a reduction in the amount of air being carried away from the heater by the fan 12.

Since the heat, therefore, is being drawn away from the parts surrounding the heater at a lesser rate during the periods of energization of the heater element 43, the heat given off by the heater element is more effectively and rapidly localized in the chamber 24 to immediately raise the temperature thereof to the desired operating temperature. There is thus provided an automatic choking effect for the heater which is progressively obtained for both directions of movement of the bi-metal arm 72.

The air tubes 35, which supply air from the air chamber 25 to the combustion chamber 29, are similar in structure and operation to the tubes 35 described with reference to the embodiment in Fig. 1, and further description thereof is believed to be unnecessary.

With reference to the embodiment illustrated in Fig. 3 there is shown a heater including a housing 91 of substantially cylindrical form provided with a recirculated air outlet 92 at one end and an inlet 93 at the opposite end thereof, which are in connection through a passage 94; the passage 94 being formed between the housing 91 and axially aligned combustion and air supply chambers 96 and 97, respectively, which are concentrically arranged within the housing 91. The motor 14 is common to the recirculated air fan 12 and the fresh air supply fan 11, the fan 12 acting to draw air from the car passenger compartment through the inlet 93 and into the passage 94 and about the radiating fins 19' for discharge through the outlet 92 back into the car compartment, and the fan 11 acting to draw air from the fresh air inlet 98 for discharge into the air supply chamber 97. The air supplied to the chamber 97 by the fan 11 is admitted into the mixing chamber 24' through ports 42'; the chamber 24' and equalizing chamber 27' being formed in a tubular housing 99, which is arranged within the air supply chamber 97 and at the inlet of the elongated passage 101 in the combustion chamber 96. The fuel nozzle 38', which is connected with the pump 13' through supply line 39, is assembled in the apex of the cone portion 36' of the chamber 24', the fuel from the nozzle being mixed with the air from ports 41' and 42' in the manner previously described in connection with Fig. 1. The chamber 27' is separated from the chamber 24' by a copper partition 26' having apertures 28' and from the combustion chamber passage 101 by a ceramic partition 31' having apertures 32' and being formed with igniter elements 34'.

A preheating coil having an enclosing shell 103 is disposed within the chamber 24' in a position to have the fuel and air from the nozzle 38' and ports 42' impinge thereon; the vaporization of the air and fuel providing for a continuous cooling of the shell during operation of the heater. The shell 103 is formed of copper and is electrically but not thermally insulated from the housing structure 99 by a suitable gasket 108, which may be provided in mica. The radiant heat from the coil 102 is confined within the shell 103, the heat in turn radiated from the shell acting to heat the mixing chamber 24'. The temperature of the chamber 24' is thus directly responsive to the heat of the shell 103, the enclosing of the coil 102 acting to prevent any of the fuel and air mixture in the chamber 24' from directly contacting the coil. The coil 102 is in series connection with an ignition coil 104 which is located in the combustion chamber 96 at the inlet of the passage 101, the conditioning of the fuel and its ignition being controlled in a manner now to be described.

The control system includes a thermal unit 106 which is located in the passage 94 and attached to a conducting bracket 107, the bracket 107 being mounted at the lower end of the shell 103 in electrical and thermal connection with the shell. The thermal unit 106 includes a bi-metal contact arm 109 which is supported in the bracket 107 so as to be in electrical and thermal relation therewith. The temperature of the shell 103 is thus seen to be controlling in the operation of the thermal unit 106 and hence in the providing of a desired temperature in the chamber 24'. The bi-metal arm 109 is normally in closed contact with a contact arm 111 which, during operation of the control system, controls the energization of the preheating coil 102 and ignition coil 104, the circuit from the battery 51' being comprised of conductor 112, contact arm 111, bi-metal arm 109, bracket 107, shell 103, preheating coil 102, conductors 113 and 114, ignition coil 104 and back to ground through the ignition coil housing 116.

The bi-metal arm 109 is adapted for mechanical but not electrical connection with a contact arm 117 which effects electrical contact with contact arm 118 to provide for an energization of the circuit for the motor 14 and hence an operation of the fans 11 and 12 and fuel pump 13'. The motor circuit from the battery 51' includes conductor 112, contact arms 117 and 118 and conductor 119, the pump 13' being connected to conductor 119 through conductor 120, breaker assembly 121, and conductor 122; the pump circuit being completed by the ground connection 123. The contact arms 111, 117 and 118 of the thermal unit 106, are insulatingly mounted from each other and from the bi-metal arm 109.

In operation the control system is closed by the double-throw main switch 124, which permits current to flow from the battery 51' through conductor 112 to contact arm 111 and through bi-metal switch 109 to simultaneously energize the preheating coil 102 and ignition coil 104. As the temperature of the mixing chamber 24' is raised by the heat radiated from the shell 102 to about 150° F., the bi-metal switch 109, in response to the temperature of the shell 103, moves downwardly, as seen in Fig. 3, to mechanically engage contact arm 117 to move the arm 117 into electrical contact with arm 118, whereby to close the circuits of the fuel pump 13' and fan motor 14. The arm 111, which is suitably tensioned to maintain a normally closed contact with the bi-metal arm 109, continues to follow the arm 109 after electrical contact has been made between arms 117 and 118, the bi-metal arm 109 and contact arms 111, 117 and 118 all moving downward together. It is thus seen that air and fuel are supplied to the chamber 24 only after the temperature of the chamber has been raised to a predetermined degree, and that preheating coil 102 and ignition coil 104 continue to be energized after combustion has been initiated.

When the temperature of the shell 103 reaches a temperature corresponding to a minimum optimum temperature of the chamber 24' for obtaining a thorough mixing of the air and fuel supplied to the chamber, the bi-metal arm 109 breaks away from contact arm 111 to open the circuit of the pre-heater and igniter coils, the arm 109, and arms 117 and 118 continuing their downward movement together. The concurrent closed contact between bi-metal arm 109 and arm 111, and arms 117 and 118, occurs for a movement of the bi-metal arm 109 corresponding to a temperature change of about 50° F. in the chamber 24'. The initiation and maintenance of combustion in the chamber 96 by the igniter 104 provides for the heating of the igniter elements 34' to a red glow, so that upon opening of the igniter circuit sufficient heat is present in the elements 34' to effect a burning of the mixture supplied to the chamber 96.

After combustion has been initiated in this manner, a portion of the heat of combustion is transmitted to the mixing chamber 24' so as to aid in the heating thereof by the preheating coil 102. During normal operation of the heater the heat from the combustion chamber will substantially compensate for the cooling action on the shell 103 by the air and fuel being impinged thereon. The heating action of the combustion chamber and the cooling action of the air and fuel impinged on the shell 103 provides for an immediate movement of the bi-metal arm 109 in response to the temperature changes of the shell 103, since there is substantially no time lag between the occurrence of the temperature change in the shell 103 and the actuation of the heater and ignition coils by the bi-metal arm 109 in response to the temperature change of the shell 103. Operation of the heater will continue in this manner so long as the shell 103 is maintained at a temperature which is sufficiently high to hold the bi-metal switch 109 out of contact with the arm 111 and in operative contact with the arms 117 and 118.

However, when the temperature of the shell 103 drops below that necessary to effect a proper mixing of the air and fuel in the chamber 24', that is, below a chamber temperature of about 200° F., the bi-metal arm 109 moves upward to contact the arm 111, whereby to energize the preheating coil 102 and ignition coil 104. As previously mentioned, this energization of the heating and ignition coil circuits will not affect the energization of the pump and motor circuits, because of the period of concurrent closed contact of the bi-metal arm 109 and the arm 111, and arms 117 and 118, so that air and fuel will continue to be supplied to the mixing chamber 24'. Upon a reheating of the chamber 24' to its predetermined optimum temperature the bi-metal arm 109 moves downwardly to again break contact with the arm 111 to open the circuit of the preheating and ignition coils. The cyclic operation of the bi-metal arm 109 to maintain a proper operating temperature of the chamber 24' will continue during the normal operation of the heater. Operation of the system is stopped by opening the switch 124.

The switch 124 is of double-throw type, the corresponding terminals thereof being in the circuit of the preheater coil 102 and igniter coil 104, and in the circuit of the pump 13'. The circuit for the motor 14 thus remains closed until the thermal unit 106, and specifically the bi-metal arm 109 thereof, returns to its initial starting position. With the heater in normal operation the bi-metal arm 109 is in mechanical engagement with the arm 117 to provide for an electrical contact between the arms 117 and 118. An opening of the switch 124, therefore, with the bi-metal arm 109 in normal operating position, will open the circuit of the heater coil 102 and igniter coil 104 and also the circuit of the pump 13'. but the circuit of the motor 14 will remain closed from the battery 51' through conductor 112, arms 117 and 118 and conductor 119. The motor 14 will continue in operation until the arm 109 has moved upward sufficiently to break the electrical contact between the arms 117 and 118. The operation of the motor 14 after opening of the main switch 124, thus provides for a complete sweeping out of all unburned fuel from the combustion chamber 96 to preclude the possibility of any explosion of the fuel upon a later starting of the heater. A continued operation of the fan 12 by the motor 14 also provides for a complete utilization of the heat retained in the heater after combustion has ceased.

If, during the operation of the heater, the preheating coil 102 should fail for any reason to become heated upon contact of the bi-metal arm 109 with arm 111, the arm 109 will continue to move upwardly to break its mechanical engagement with the arm 117 and the electrical connection between the arms 117 and 118, whereby to open the circuits of the fuel pump 13' and motor 14, to stop the operation of the heater. The accumulation of raw fuel in the combustion chamber 96 by a failure of ignition is thus eliminated. Also, in the starting of the control system, the shell 103 for the preheating coil 102 must be heated sufficiently to move the arm 109 into engagement with the contact arm 111 to make contact between the arms 117 and 118. Thus, if for any reason, the preheating coil 102 or ignition coil 104 should become short-circuited, or fail to radiate the required amount of heat, the bi-metal arm 109 will not be actuated to effect contact between the arms 117 and 118, whereby the fuel pump 13' and motor 14 will remain inoperative. The operation of the heater, therefore, is predicated upon sufficient heat in the chamber 24' to vaporize the air and fuel supplied to the chamber to positively provide for the ignition and complete burning of the mixture upon its admission into the combustion chamber 96.

The automatic choking effect and decrease in the heat carried away from the heater upon energization of the mixing chamber heater element, described in connection with the embodiments of Figs. 1 and 2, also occurs in the embodiment of Fig. 3. The conductor 112, which has a resistance therein designated as R, is common to the circuit of the preheater and ignition coil, and to the circuit of the motor 14. When the switch 124 is closed the line drop in conductor 112, as produced by the resistance R, is the result only of the load of the preheater coil 102 and ignition coil 104. Upon movement of the bi-metal arm 109 to provide for an electrical contact between the arms 117 and 118, the line drop in the conductor 112 is due to the combined effect of the load produced by the heater coil 102, igniter coil 104, fuel pump 13' and motor 14. This condition of operation of the control system corresponds to the condition of heaviest load by the heater on the battery 51' and hence of low speed operation of the motor 14. When the bi-metal arm 109 moves downwardly, as viewed in Fig. 3, a distance sufficient to break contact with the arm 111, the line drop in the conductor 112 is due only to the load imposed by the motor 14 and pump 13'. Since the load by the motor 14 and pump 13' is relatively low as compared to the load effected by the heater coil 102 and igniter coil 104, the speed of the motor 14 is appreciably increased, this increase in speed being on the order of about 30% higher than the speed obtained with the preheater coil 102 in operation. Since the motor 14 is common to the fans 11 and 12, a decrease in the speed of the motor effects a corresponding decrease in the speed of the fans. The enriching of the mixture in the chamber 24' at decreased motor speeds is obtained by the decrease in the air supplied to the chamber 97 by the fan 11 at a rate which is greater than the decrease in the fuel discharged by the pump 13'. The decrease in the quantity of air circulated through the passage 94, to provide for a greater localizing of the heat from the heater coil 102 upon energization thereof, is obtained by the reduced speed of the fan 12.

The air and fuel supplied to the chamber 24' is regulated to provide for a normally rich mixture, so as to effect a ready ignition of the mixture in the combustion chamber 96. However, as previously described, a rich mixture, although readily ignited, is not adapted for efficient and complete burning. The mixture, therefore, after ignition is made lean by the mixing therewith of supplementary air from the air passage 35', the passages 35' being formed at the inlet to the combustion chamber 96 for direct communication between the combustion chamber and air supply chamber 97; the quantity of air admitted through the passages 35' being varied directly by the fan 11 in accordance with the richness ratio of the mixture in the chamber 24'.

There is thus provided an electrical control system for an automobile heater operable completely independently of the automobile engine, which provides for a thorough mixing of the air and fuel at low pressures by completely vaporizing the mixture to condition the mixture for an efficient burning at all times of normal heater operation. The system is quickly responsive to any temperature changes in the air and fuel mixing chamber and acts to maintain the temperature of the mixing chamber substantially uniform at all times of heater operation. The speed of the air supply and circulating fans, 11 and 12, respectively, is responsive to the energization or operation of the mixing chamber heating element to provide for an automatic choking of the mixture and for a decrease in the heat carried away from the heater during such periods of energization, whereby to facilitate the maintenance of efficient combustion of the mixture by the substantial elimination of temperature drifting in the heater structure. The provision of a relatively rich mixture in the mixing chamber to assure its ignition and the leaning of the mixture after ignition to completely burn the mixture, provides for a positive and efficient combustion of the entire mixture and a consequent maximum heat ouput from the air and fuel supplied to the heater. The control system further is of simple and rugged construction and is comprised of but few parts whereby to reduce servicing adjustments to a minimum, and to provide for a positive and long operation of the system with hard use.

Although the invention has been described and illustrated with specific reference to a low pressure automobile heater, it is to be understood that the control system may be used in connection with heaters of low pressure type adapted for small service or domestic heating purposes. It is to be understood also that only preferred embodiments of the invention have been described and illustrated herein and that modifications and alterations thereof can be made which are within the full intended scope of the invention as defined by the appended claims.

I claim:

1. In the control system for a heating device including an air and fuel mixing chamber, electrical heating means in said mixing chamber, a circuit for said electrical heating means, means for supplying air to said mixing chamber, means for supplying fuel to said mixing chamber, a motor for operating said air supply and fuel supply means, a circuit for said motor, thermostatic switch means in the circuit for said heating means responsive in operation to the heat from said heating means to close the same, and conductor means common to said two circuits having a resistance such that a voltage drop is produced in said conductor means on closing of the circuit for said heating means, with said voltage drop varying the speed of the motor to automatically decrease the amount of air and fuel supplied to said mixing chamber concurrently with the closing of the circuit for said heating means.

2. In a control system for a heater of internal combustion type having an air and fuel mixing chamber and a combustion chamber, means for supplying air to said mixing chamber, means for supplying fuel to said mixing chamber, an electrical heating element in said mixing chamber, with said fuel being vaporized in said mixing chamber for mixing with said air, means in said combustion chamber for igniting said mixture, a circuit for said electrical heating element, means for supplying supplementary air to said combustion chamber for leaning said air and fuel mixture after ignition thereof by said ignition means, a motor for operating said air and fuel supply means and said supplementary air supply means, a control circuit for said motor, thermal switch means in the circuit for said heating element responsive to the temperature changes of said heating element to close said element circuit, and a conductor common to said two circuits having a resistance such that a voltage drop is produced therein on closing of the circuit for said heating element, said voltage drop decreasing the speed of said motor so that the mixture supplied to said mixing chamber is automatically enriched by the relative operation of said air and fuel supply means at such reduced speed, with the quantity of supplementary air supplied to said combustion chamber being automatically varied in correspondence with the richness ratio of said mixture.

3. In a control system for a heater having an air and fuel mixing chamber and a combustion chamber, an electrical heating element in said mixing chamber, ignition means in said combustion chamber, a circuit for said heating element including said ignition means, electrically operated means for supplying air and fuel to said mixing chamber for conditioning by said electrical heating element, a circuit for said electrically operated means, a main switch for controlling the operation of said control system, thermostatic switch means common to the circuits of said heating element and said electrically operated means and including a bi-metal actuating arm disposed between paired flexible contact arms, one pair of said contacting arms being tensioned toward said bi-metal arm and adapted to open and close said heating element circuit and the other pair of contacting arms being adapted to open and close the circuit of the electrically operated means, the bi-metal arm being moved to actuate said contacting arms in response to the temperature changes of said heating element, the said one pair of contacts on closing of said main switch being in closed position against said bi-metal arm to close the heating element circuit to energize said heating element, the heat from the heating element moving said bi-metal arm to engage said other pair of contact arms to close the circuit of said electrically operated means, continued heating of the bi-metal arm by the heating element moving the bi-metal arm away from said first pair of contact arms to open said arms to open the circuit of the heating element, the circuit for the electrically operated means being held closed by the bi-metal arm during its operative movement in opening and closing the heater element circuit.

4. In a control system for a heating device having an air and fuel mixing chamber and a combustion chamber, electrically operated means for supplying air and fuel to said mixing chamber, a circuit for said air supply means, a circuit for said fuel supply means, an electrical heating element in said mixing chamber vaporizing said fuel for mixing with said air, a circuit for said heating element, thermal switch means common to said three circuits and responsive in operation to the temperature changes of said heating element, a heating coil in the circuit of said air supply means, a normally closed bi-metal switch in the circuit of said fuel supply means responsive in operation to the heat from said heating coil, and means for connecting all of said circuits to a source of electricity, closing of said connecting means effecting a simultaneous operation of said heating element and said fuel and air supply means, with the circuit of the heating element only being closed through said thermal switch means, the heat from said heating element operating said thermal switch means to close the circuit of the fuel supply means so that when said bi-metal switch is opened by said heating coil the circuit for said fuel supply means is closed through said switch means, with said bi-metal switch remaining open on failure of said heating element to operate to render said fuel supply means inoperative, and said air supply means continuing in operation until said connecting means is opened.

5. In a control system for an internal combustion heater having electrically operated air and fuel supply means, the combination of a circuit for said fuel supply means, a circuit for said air supply means including a heating coil, a normally closed bi-metal switch responsive in operation to the heat from said heating coil, an electrically operated element for heating said air and fuel and vaporizing said fuel for mixing with said air, a circuit for said heating element, thermal switch means common to said three circuits and responsive in operaton to the temperature changes of said heating means to open and close said three circuits, and means connecting said three circuits to a source of electricity, closing of said connecting means effecting a simultaneous operation of said heating element and air and fuel supply means, with the heating element circuit only being closed through said thermal switch means, the heat from said heating element operating said thermal switch means to close the circuit for said fuel supply means through said switch means so that said fuel supply means continues in operation after opening of said bi-metal switch by said heating coil, the bi-metal switch acting as a time element for defining the duration of operation of said fuel supply means prior to the heating of said preheating element to a predetermined temperature.

6. In a control system for a heater having a combustion chamber, electrically operated means for supplying air and fuel to said chamber, a circuit for said air supply means, a circuit for said fuel supply means, electrical means for heating and vaporizing said fuel for mixing with said air prior to the admission of said air and fuel mixture into said combustion chamber, a circuit for said heating means, and thermostatic switch means common to said three circuits and responsive to the temperature of said heating means to open and close said three circuits, with said heating element circuit on starting of operation of said control system being closed and said circuits for said air and fuel supply means being opened by the arrangement of said thermostatic switch means, said thermostatic switch means on heating of said heating means to a predetermined temperature for vaporizing said fuel closing the circuits for said air and fuel supply means.

7. In a control system for a heater having a combustion chamber, electrically operated air and fuel supply means, a circuit for said fuel supply means, a circuit for said air supply means, electrical means for heating said air and fuel and vaporizing said fuel for mixing with said air prior to the admission of the air and fuel mixture into said combustion chamber, a circuit for said heating means, thermal switch means common to said three circuits and responsive to the changes in temperature of said heating means to open and close said three circuits, and switch means for opening and closing said control system, said switch means being common to the circuits for said heating means and fuel supply means, with the said circuit for said heating means being closed and the circuits for said air and fuel supply means being opened by the arrangement of said thermal switch means when said switch means is initially closed, said thermal switch means on heating thereof by said heating means to a predetermined temperature closing the circuits for said air and fuel supply means, with the circuits for said fuel supply and heating means being opened on opening of said switch means, said air supply circuit being retained closed by said thermostatic switch means until said thermostatic switch means has cooled to a predetermined temperature.

8. In a control system for combustion apparatus having air and fuel supply means, electrically operated heating means for vaporizing said fuel for mixing with said air prior to the combustion of said mixture, an operating motor common to said air and fuel supply means, a circuit for said motor, a circuit for said electrically operated heating means, thermal switch means in said latter circuit responsive to the temperature changes of said heating means to close said latter circuit, and a conductor common to said two circuits having a resistance adapted to produce a voltage drop therein when said circuit for said heating means is closed, said voltage drop decreasing the speed of said motor so that said air and fuel mixture is automatically enriched by the relative operation of said air and fuel supply means at said reduced speed concurrently with a closing of the circuit for said heating element.

9. In a control system for a heating unit having an air and fuel mixing chamber, means for circulating air about said unit, an electrical heating element in said mixing chamber, a circuit for said heating element, an operating motor for said air circulating means, a circuit for said motor, thermostatic switch means common to said motor and heating element circuits and responsive to the temperature changes of said heating element to open and close said two circuits, a main switch for controlling the operation of said control system, said circuit for the heating element being closed and said motor circuit being opened by the arrangement of said thermal switch means when said main switch is first closed, with heating of said heating element to a predetermined temperature operating said thermostatic means to close said motor circuit and to open said heater element circuit, said motor circuit remaining closed as the heater element circuit is alternately closed and opened in the maintenance of said heating element at said predetermined temperature, and a conductor common to said two circuits having a resistance which produces a voltage drop therein on closing of said heater element circuit, said voltage drop automatically decreasing the speed of said motor to reduce the amount of air circulated about said unit concurrently with an energization of said heating element to reduce the transfer of heat from said mixing chamber.

10. In a control system for a heater having an air and fuel mixing chamber in thermal connection with a heat generating unit, an electrically operated heating element in said mixing chamber for heating said mixing chamber to a predetermined temperature, a circuit for said heating element, means for circulating air about said unit, and means for supplying air and fuel to said mixing chamber, said fuel being vaporized in said chamber for mixing with said air, an operating motor common to said air circulating means and to said air and fuel supply means, a circuit for said motor, thermal switch means in the circuit for said heating element arranged so as to be responsive to the temperature changes of said heating element to open and close said element circuit, and a conductor common to said two circuits having a resistance such that the load of said heating element produces a line drop in said conductor, said line drop effecting a decrease in the speed of said motor to operate said air circulating means at a reduced speed so that the quantity of heat being carried away from said unit is reduced concurrently with an operation of said heating element.

11. In a control system for a heating device having electrically operated air and fuel supply means, the combination of a circuit for said air supply means including a heating coil, an electrically operated element for heating the air and fuel from said supply means and vaporizing said fuel for mixing with said air, a circuit for said heating element, a circuit for said fuel supply means including a normally closed bi-metal time switch which is responsive to the heat of said heating coil, said time switch being adapted to open the circuit for said fuel supply means on failure of operation of said heating element, thermal switch means common to said three circuits and responsive in operation to the heat from said heating element to open and close each of said three circuits, a main switch for controlling the operation of said control system, with closing of said main switch effecting a simultaneous operation of the heating element and said air and fuel supply means, with the circuit of said heating element only being closed through said thermal switch means, said thermal switch means on heating of said element to a predetermined degree acting to open the circuit of the heating element and to close the circuits of said air and fuel supply means, with closing of said fuel supply circuit through said thermal switch means rendering said time switch inoperative, and a conductor common to said three circuits having a resistance such that a desired voltage drop is produced therein when said heating element is in operation, with opening of said heating element circuit decreasing the voltage drop in said conductor and increasing the speed of operation of said air and fuel supply means to increase the amount of air and fuel being supplied to said heating device.

12. In a control system for a heater having a chamber for mixing air and fuel to be burned, means for supplying air and fuel to said chamber, and electrical means for heating said chamber to at least a fuel vaporizing temperature, the combination of a circuit for said fuel supply means, a circuit for said air supply means, and a circuit for said heating means, switch means connected with a source of electricity and operatively associated with said three circuits to initiate the operation of said control system, and thermostatic switch means common to the circuits for said air supply and heating means responsive in operation to the heat from said heating means, and arranged to close the circuit for said heating means therethrough so that said heating means is energized when said switch means is initially closed, said thermostatic switch means on heating of said heating means to substantially a fuel vaporizing temperature acting to close the circuit for said air supply means therethrough, said switch means on being opened disconnecting the circuits of said fuel supply means and heating means from said source of electricity, with the circuit for said air supply means remaining closed through said thermostatic switch means until the temperature of said heating means drops below a substantially fuel vaporizing temperature to provide a delayed operation of said air supply means.

13. In a control system for a heater having an air and fuel mixing chamber and a combustion chamber, an electrical heating element in said mixing chamber, ignition means in said combustion chamber, a circuit for said heating element including said ignition means, electrically operated means for supplying air and fuel to said mixing chamber, a circuit for said electrically operated means, a main switch for controlling the operation of said control system, thermostatic switch means common to the circuits of said heating element and said electrically operated means and including a bi-metal actuating arm and a plurality of flexible contact arms, one of said contact arms being adapted to open and close said heating element circuit, and another of said contact arms being adapted to close the circuit of the electrically operated means, with the bi-metal arm being moved relative to said contact arms in response to the temperature change of said heating element, said one contact arm on closing of said main switch being in a closed position against said bi-metal arm to close the heating element circuit, with the heat from the heating element moving said bi-metal arm to engage said other contact arm to close the circuit of said electrically operated means, with the continued heating of the bi-metal arm by the heating element moving the bi-metal arm away from said one contact arm to open the circuit of the heating element, the circuit for the electrically operated means being opened by the movement of the bi-metal arm away from said another contact arm on cooling of said heating element.

14. In a control system for a heater having a combustion chamber, electrically operated air and fuel supply means, a circuit for said fuel supply means, a circuit for said air supply means, electrical means for heating said air and fuel and vaporizing said fuel for mixing together with said air prior to the admission of the air and fuel mixture into said combustion chamber, a circuit for said heating means, thermal switch means common to the circuits for said air supply means and heating means and responsive to the changes in the temperature of said heating means to open and close said two circuits, and switch means for connecting said three circuits to a source of electrical power, with the circuit for said heating means being closed by the arrangement of said thermal switch means when said switch means is initially closed, said thermal switch means on heating thereof by said heating means to a predetermined temperature closing the circuit for said air supply means, with the circuits for said fuel supply and heating means being opened on opening of said switch means, said air supply circuit being retained closed by the thermostatic switch means until said thermostatic switch means has cooled to a predetermined temperature.

HARRY B. HOLTHOUSE.